United States Patent
Koyama et al.

(10) Patent No.: US 9,459,617 B2
(45) Date of Patent: Oct. 4, 2016

(54) MOTION CONTROLLER

(75) Inventors: Masahiro Koyama, Tsuchiura (JP);
Takashi Saegusa, Hitachinaka (JP);
Terunobu Funatsu, Tsuchiura (JP);
Yosuke Horie, Hitachinaka (JP)

(73) Assignee: HITACHI, LTD., Tokyo (JP)

( * ) Notice: Subject to any disclaimer, the term of this patent is extended or adjusted under 35 U.S.C. 154(b) by 769 days.

(21) Appl. No.: 13/977,092

(22) PCT Filed: Dec. 28, 2010

(86) PCT No.: PCT/JP2010/073680
§ 371 (c)(1),
(2), (4) Date: Jun. 28, 2013

(87) PCT Pub. No.: WO2012/090291
PCT Pub. Date: Jul. 5, 2012

(65) Prior Publication Data
US 2013/0282148 A1    Oct. 24, 2013

(51) Int. Cl.
*G05B 19/418*    (2006.01)

(52) U.S. Cl.
CPC ... *G05B 19/4185* (2013.01); *G05B 2219/2231* (2013.01); *G05B 2219/2236* (2013.01); *Y02P 90/12* (2015.11); *Y02P 90/18* (2015.11)

(58) Field of Classification Search
None
See application file for complete search history.

(56) References Cited

U.S. PATENT DOCUMENTS

| | | | | |
|---|---|---|---|---|
| 6,430,218 B1 * | 8/2002 | Mito | | H04L 12/403 375/220 |
| 2002/0126620 A1 * | 9/2002 | Heckel | | G05B 19/0428 370/216 |
| 2003/0004686 A1 * | 1/2003 | Ueno | | G05B 19/0423 702/188 |
| 2003/0230998 A1 | 12/2003 | Miyaji et al. | | |
| 2006/0235594 A1 * | 10/2006 | Knoefler | | F02D 41/266 701/48 |
| 2006/0251046 A1 * | 11/2006 | Fujiwara | | H04L 12/40052 370/350 |
| 2014/0248866 A1 * | 9/2014 | Itoh | | H04W 84/20 455/418 |

FOREIGN PATENT DOCUMENTS

| | | |
|---|---|---|
| JP | 6-175859 | 6/1994 |
| JP | 2002-6912 | 1/2002 |
| JP | 2004-78895 | 3/2004 |

* cited by examiner

*Primary Examiner* — Ryan Jarrett
(74) *Attorney, Agent, or Firm* — Baker Botts L.L.P.

(57) ABSTRACT

A motion controller is provided which improves system responsiveness without having to raise the arithmetic capacity of a master controller or to boost the communication speed of a network. The master controller 1 uses a program analysis unit 1g to separate, from a control program designating a tolerable delay time for operating control target apparatuses, a slave use program to be executed by a slave controller in a manner not to exceed the tolerable delay time, and to create slave-to-slave communication setting information needed by the slave controller to execute the slave use program. Through slave-to-slave communication, the slave controller 2 acquires input/output information from another slave controller. The slave controller 2 also uses a slave use program execution unit 2f to execute its own slave use program.

7 Claims, 12 Drawing Sheets

FIG.7

| INPUT PORT NO. [801] | SLAVE NO. [802] | DEVICE NAME [803] |
|---|---|---|
| 0 | 1 | SENSOR A |
| 1 | 1 | SENSOR B |
| ⋮ | | |
| 16 | 2 | SWITCH 0 |
| 17 | 2 | SWITCH 1 |
| ⋮ | | |

FIG.8

| AXIS NO. [901] | SLAVE NO. [902] | AXIS NAME [903] |
|---|---|---|
| 1 | 2 | MOTOR 1 |
| 2 | 3 | MOTOR 2 |
| 3 | 5 | MOTOR 3 |
| 4 | 6 | MOTOR 4 |
| ⋮ | | |

MOTION CONTROLLER

TECHNICAL FIELD

This invention relates to a motion controller that controls control target apparatuses built into industrial machinery or the like and interconnected via a network.

BACKGROUND ART

In recent years, control systems have been adopted which are aimed at saving wires in an FA (factory automation) system and which interconnect various types of control equipment via a network. In industrial machinery, in particular, drivers for driving various axis motors making up the drive section of the machinery and input/output devices included in peripheral equipment are interconnected via a network as control target apparatuses and controlled by a motion controller.

FIG. 15 is a schematic view showing a general structure of such a network type motion control. In FIG. 15, a master controller (called the master hereunder) 201 for overall control and slave controllers (called the slaves hereunder) 202 for directly driving control target apparatuses are interconnected via a network 203. The master 201 has a program execution unit executing control programs, and a master communication unit communicating with the slaves 202 via the network 203 in order to input signal status 204 of sensors or the like in the slaves 203 as well as to output commands 205 for operating the control target apparatuses such as motors.

Here, the program execution unit of the master executes control programs stored in, say, a memory at predetermined intervals (called the control cycle hereunder). A growing number of control target apparatuses (i.e., number of slaves) and increasingly complicated control processes contribute to prolonging the control cycle of the master. While communications between the master and the salves are conducted also at predetermined intervals (called the communication cycle hereunder), the growing slave count tends to prolong the communication cycle of the network as well.

Generally, the control cycle of the master is set to an integral multiple of the communication cycle. The control cycle of the master determines the responsiveness of the control system, i.e., a delay time (latency) that elapses from the time a status change is detected in the input signal from sensors or the like until the time machinery operation is actually changed accordingly.

Thus, improving the responsiveness of the control system in the past required shorting the communication cycle of the network and the control cycle of the master, i.e., improving the communication speed over the network and boosting the arithmetic capacity of the master. However, this method has posed the problem of raising the cost of the control system.

For this conventional network type motion controller, there exists a known method described in Patent Literature 1 cited below. With this method, a servo response management unit separate from a servo command issuance processing unit determines whether or not a termination condition suitably established irrespective of the execution of axis movement commands within a motion program is met. If the termination condition is determined to be met, the servo response management unit notifies the servo command issuance processing unit thereof and executes a different command in order to enhance the speed of a servo command issuing process.

PRIOR ART LITERATURE

Patent Literature

[Patent Literature 1]
JP-2002-6912-A

SUMMARY OF THE INVENTION

Problem to be Solved by the Invention

According to the method described in the above-cited Patent Literature 1, the responsiveness of the motion controller (master) is determined by the execution cycle of the servo response management unit. In the fastest-case scenario, the motion controller can respond in the communication cycle of the network. However, this method requires shortening the network communication cycle, i.e., improving the communication speed. This further requires boosting the arithmetic capacity of the master in keeping with the raised communication speed.

Also, where the master processes its control program in centralized fashion as in the past, the master executing the program is subject to growing operation load because the scale of control targets has been expanded and because control processing has become increasingly complicated. This can be a factor impeding an increase of the above-mentioned responsiveness.

It is therefore an object of this invention to provide a network type motion controller that implements rapid response of the system without having to raise the arithmetic capacity of the master or to boost the communication speed on the network.

Means for Solving the Problem

In achieving the above-mentioned objective, there is provided a motion controller including a master controller and at least one slave controller interconnected via a network so as to perform input/output operation or control processing on a plurality of control target apparatuses. The master controller includes: a program analysis means which inputs a control program with a tolerable delay time designated therein for operation of the control target apparatuses, separates from the control program a slave use program to be executed by the slave controller in a manner not to exceed the delay time, and generates slave-to-slave communication setting information needed by the slave controller to execute the separated slave use program; a master use program execution means which executes a master use program left after the slave use program is separated from the control program; a slave use program transfer means which transfers the slave use program to the slave controller via the network; a slave-to-slave communication setting means which transfers master-to-slave communication setting information and the slave-to-slave communication setting information to the slave controller via the network, and a master use communication means which performs communication control between the master controller and the slave controller via the network. The slave controller includes: a slave use program execution means which executes the slave use program transferred from the master controller; a slave use command execution means which executes a slave use command transmitted from the master controller via the network and received by the slave controller and a slave use command issued by the slave use program execution means; a slave use communication setting means which stores the masterto-slave communication setting information and the slave-to-slave communication setting information, and a slave use communication means which, based on the master-to-slave communication setting information and the slave-to-slave communication setting information, performs communication control between the slave controller and the master controller as well as between the slave controller and another slave controller via the network.

Also according to the above-outlined motion controller of this invention, the control program may preferably be written using a state transition diagram format, describe the commands to be executed in steps each indicative of different status, describe a termination condition for terminating each of the steps when the termination condition is met, and explicitly describe a tolerable delay time that elapses from the time the termination condition is met until the time the next step is executed. Alternatively, the program analysis means of the master controller may preferably acquire information about the delay time that is tolerable when the control target apparatuses described in the control program are operated, the program analysis means further creating the master use program and the slave use program from the control program in such a manner that if the tolerable delay time is longer than a control cycle of the master controller, the control target apparatuses are operated within the master use program and that if the tolerable delay time is shorter than a control cycle of the master controller, the control target apparatuses are operated within the salve use program of the slave controller for directly driving the control target apparatuses. If the slave use program references input/output information about the other slave controller, the program analysis means may communicate with the slave controller so as to create the slave-to-slave communication setting information for acquiring the input/output information.

Furthermore, according to the above-outlined motion controller of this invention, the program analysis means may preferably acquire information about the delay time that is tolerable when the control target apparatuses described in the control program are operated, and if the tolerable delay time cannot be met despite communication with the slave controller, the program analysis means may output an error message indicating that the tolerable delay time is incorrectly designated. Alternatively, upon initial setting of the motion controller, the slave use communication setting means may preferably transfer the master-to-slave communication setting information and the salve-to-slave communication setting information to the slave controller via the network, and the slave use program transfer means may transfer the slave use program to the slave controller.

And according to the above-outlined motion controller of this invention, upon program execution of the motion controller, the master use program execution means of the master controller may preferably execute the master use program to transmit commands to the slave controller and to receive status information from the slave controller; the slave controller may acquire input/output information about the other slave controller based on the slave-to-slave communication setting information, and the slave use program execution means of the slave controller may execute the slave use program to transmit status information indicative of current execution status to the master controller. Alternatively, a display/input means connected to the motion controller may preferably permit input of the master-to-slave communication setting information, editing of the control program, execution of the program analysis means, and verification of the master use program with regard to the master controller, and the display/input means may preferably permit verification of the master-to-slave communication setting information, the slave-to-slave communication setting information, and the slave use program with regard to the slave controller.

Advantageous Effects of the Invention

According to this invention outlined above, there is provided a motion controller capable of improving the response of the system without having to raise the arithmetic capacity of the master controller or to boost the communication speed on the network. The motion controller is also provided to create easily a control program for implementing rapid response by automatically separating therefrom a program to be executed by slaves in such a manner that a tolerable delay time designated by the control program will not be exceeded.

BRIEF DESCRIPTION OF THE DRAWINGS

FIG. 7 shows a typical input/output port mapping table for the above-mentioned motion controller.

FIG. 8 shows a typical axis mapping table for the above-mentioned motion controller.

MODE FOR CARRYING OUT THE INVENTION

Some embodiments of the present invention are explained below in detail by reference to the accompanying drawings.

Figure 1:
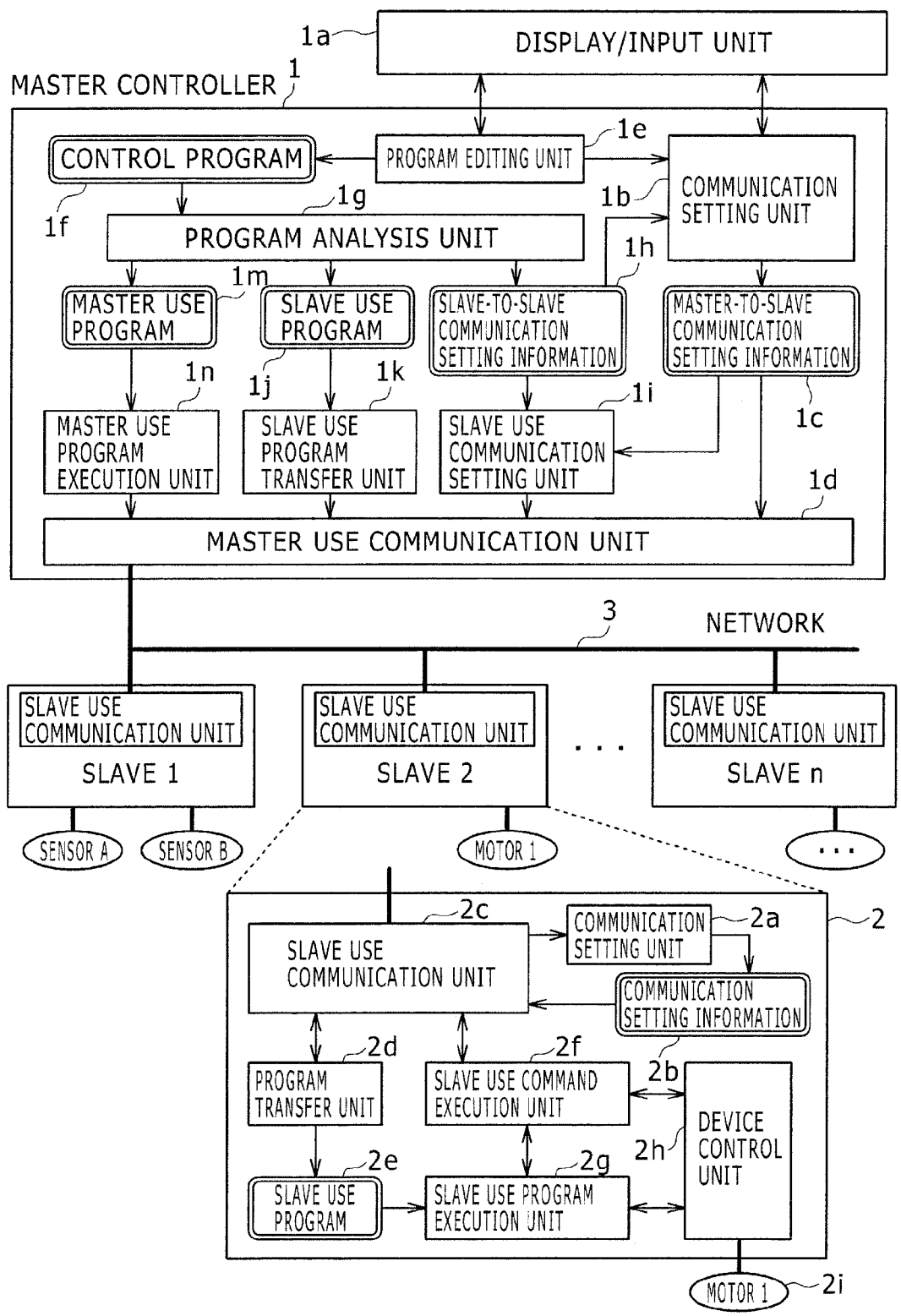
FIG. 1 shows a structure of a motion controller as an embodiment of this invention.

FIG. 1 shows a structure of a motion controller as one embodiment of this invention.

As is evident from FIG. 1, the motion controller embodying this invention is a control system having a master controller 1 and at least one slave controller 2 interconnected via a network 3. Various control target apparatuses are connected to the slave controller 2. These control target apparatuses are controlled by the master controller 1 and/or slave controller 2.

The structure of the master controller 1 is explained first. A program editing unit 1e constitutes a means that allows a user to create a control program describing the operations of control target apparatuses using a display/input unit 1a such as a display and a keyboard. Here, the master controller 1 is structured in such a manner that the delay time tolerable for operating the control target apparatuses can be designated when the control program is described. A control program storage unit if is a means that stores the created control program. Specifically, this unit is made of a memory or the like.

The program analysis unit 1e constitutes a means that inputs the created control program, separates therefrom a slave use program to be executed by the slave controller 2 in a manner not to exceed the above-mentioned tolerable delay time, and creates slave-to-slave communication setting information needed by the slave controller 2 to execute the slave use program. A slave use program storage unit 1j is a means that stores the slave use program created here. And a slave-to-slave communication setting information storage unit 1h is a means that stores the slave-to-slave communication setting information also created. These units are each made of a memory or the like, for example.

That part of the control program which is left after the slave use program is separated serves as a master use program to be executed by the master controller 1. A master use program storage unit 1m constitutes a means that stores the master use program. And a master use program execution means 1n constitutes a means that executes the master use program. As in the case above, these units are each made of a memory or the like, for example.

A communication setting unit 1b is a means that allows the user to make communication settings between the master controller 1 and the slave controller 2 via the network 3 using the above-mentioned display/input unit 1a. The communication settings thus made constitute master-to-slave communication setting information. Also, the communication setting unit 1b may be used to verify the above-mentioned slave-to-slave communication setting information. A master-to-slave communication setting information storage unit 1c constitutes a means that stores the master-to-slave communication setting information. A master use communication unit 1d constitutes a means that controls the communications of the master controller 1 via the network 3.

A slave use communication setting unit 1i constitutes a means that transfers the above-mentioned master-to-slave communication setting information and slave-to-slave communication setting information to the respective controllers 2 via the network 3. And a slave use program transfer unit 1k constitutes a means that transfers the above-mentioned slave use program to the corresponding slave controller 2.

Although the master controller 1 was explained to have the program editing unit 1e and program analysis unit 1g in the structure shown in FIG. 1, this is not limitative of the present invention. Alternatively, these means can be incorporated in a computer (e.g., personal computer) separate from the master controller 1.

The structure of the slave controller 2 is explained next. First of all, a communication setting unit 2a constitutes a means that makes communication settings of the slave controller 2 based on the above-mentioned master-to-slave communication setting information and slave-to-slave communication setting information. A communication setting information storage unit 2b constitutes a means that stores these bodies of communication setting information. A slave use communication unit 2c constitutes a means that controls the communications of the slave controller 2 via the network 3.

A program transfer unit 2d constitutes a means that transfers the above-mentioned slave use program from the master controller 1 via the network 3. A slave use program storage unit 2e constitutes a means that stores the transferred slave use program. And a slave use program execution unit 2g is a means that executes the slave use program.

A slave use command execution unit 2f constitutes a means that executes commands transmitted from the master controller 1 to the slave controller 2 and commands issued by a slave use program execution unit 2g upon execution of the slave use program. And a device control means 2h constitutes a means that performs input/output operations and various control processes (servo control process, etc.) on a control target apparatus 2i connected to the slave controller 2.

Figure 2:
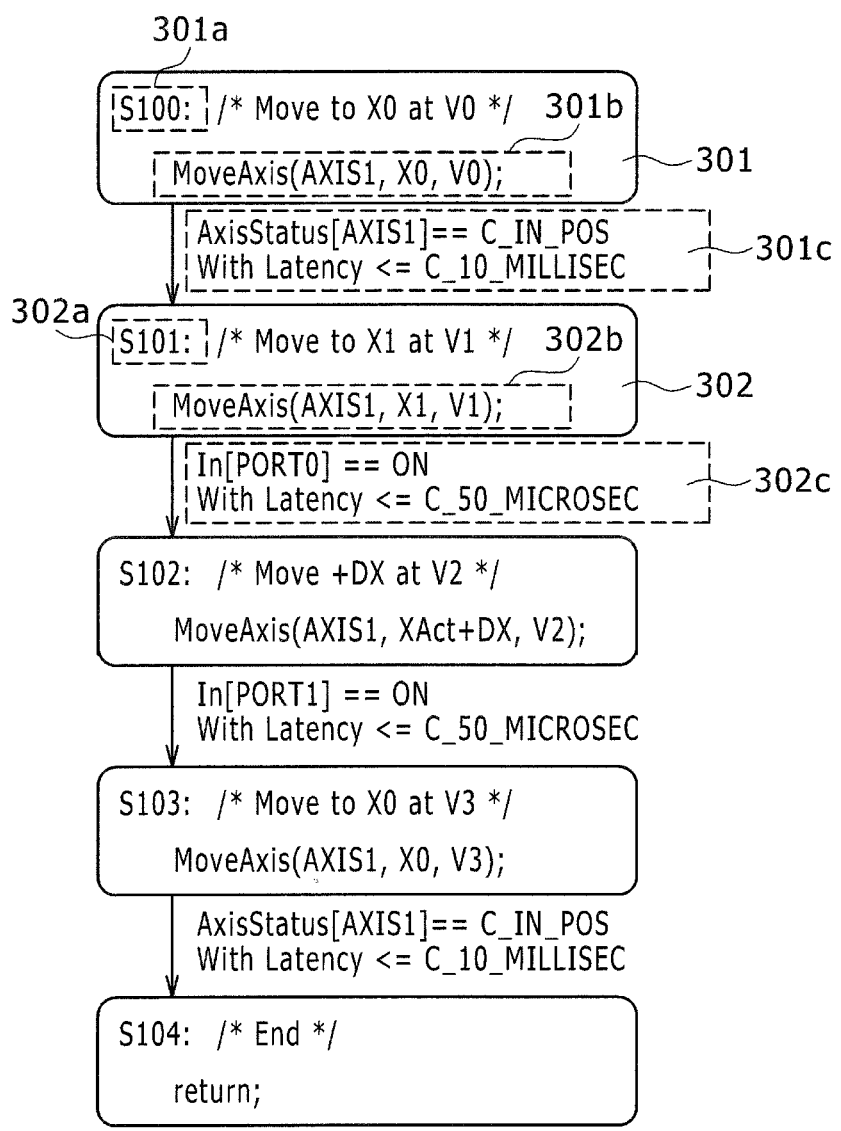
FIG. 2 shows a typical description of a control program for the above-mentioned motion controller.

Next, FIG. 2 shows a typical description of the control program for the motion controller of which the structure was explained in the foregoing paragraphs.

In FIG. 2, the program is described in a state transition diagram format. Here, step 301 corresponding to each state is described using a step number 301a ("S100") for identifying the step and a command 301b as a control process to be executed in this step 301. Further described explicitly as a transition condition 301c is a condition which, when met, has the command processing of this step regarded as terminated (this condition is called the termination condition) as well as the delay time (called the latency) tolerated from the time the termination condition is met until the time transition is made to the next step.

For example, a first step 301 (step number 301a, "S100") is described with a command 301b to move a first motor axis (AXIS1) to a target position X0 at a velocity V0 (i.e., "MoveAxis(AXIS1, X0, V0)") and with a transition condition 301c specifying that when the termination condition of whether AXIS1 is positioned to the target position is met (i.e., "AxisStatus[AXIS1==C_IN_POS"]), transition is to be made to the next step within the tolerable latency of 10 ms (i.e., "with Latency<=C_10_MILLISEC").

Likewise, the next step 302 (step number 302a, "S101") is described with a command 302b to move AXIS1 to a target position X1 at a velocity V1 (i.e., "MoveAxis(AXIS1, X1, V1") and with a transition condition 302c specifying that when the termination condition of whether the signal (of sensor A) at the 0-th input port (PORT 0) is ON (i.e., "In[PORT0]==ON") is met, transition is to be made to the next step within the tolerable latency of 50 ms (i.e., "withLatency<=C_50_MILLISEC").

Incidentally, it is assumed that the motion controller can execute a plurality of control programs in parallel (so-called multitasking) and that each of the control programs uses unique step numbers. It is also assumed that the steps of a given control program are automatically assigned serial step numbers from the first step on.

And the control program shown in FIG. 2 describes the following axis movements: First in step S301 (step number 301a, "S100"), AXIS1 is moved to the position X0 at the velocity V0 (as indicated by the comment "/* Move to X0 at V0*/"). Next in step S302 (step number 302a, "S101"), AXIS1 is moved to the position X1 at the velocity V1 (as indicated by the comment "/* Move to X1 at V1 */"). And when the sensor A connected to PORT0 is turned ON during this movement (i.e., "In[PORT0]=ON"), transition is made to step number S102. AXIS1 is then moved to the position in effect at this point and added with DX at a velocity V2 (as indicated by the comment "/* Move +DX at V2 */"). Further, when a sensor B connected to PORT1 is turned ON during this movement (i.e., "In[PORT1]==ON"), transition is made to step S103. In step S103, AXIS1 is moved to the position X0 at a velocity V3 (as indicated by the comment "/* Move to X0 at V3 */"). And tolerable latency is described in the transition condition for each step.

Figure 3:
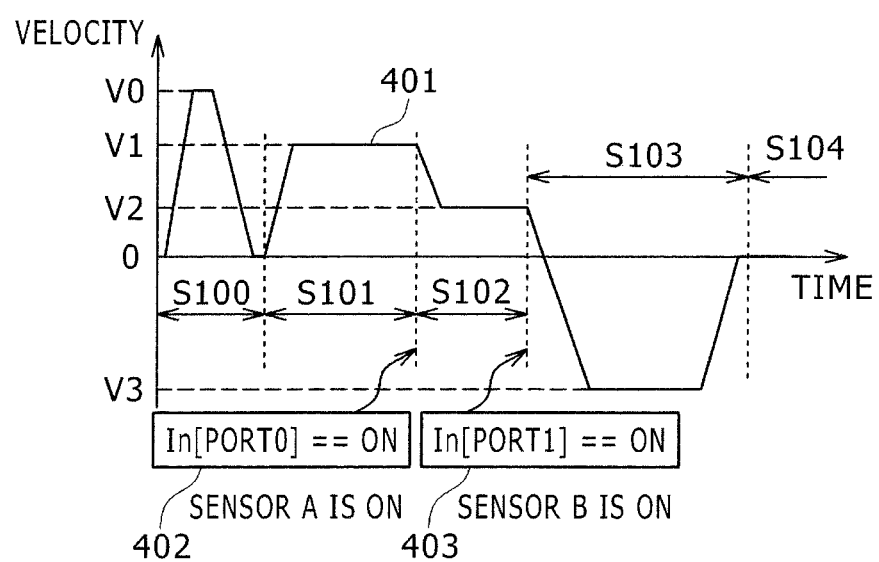
FIG. 3 shows a typical velocity pattern of axis movements described in the control program indicated in FIG. 2.

Next, FIG. 3 shows a typical velocity pattern of axis movements described in the control program indicated in FIG. 2.

FIG. 3 indicates a velocity pattern 401 for each of the steps (step numbers S100 through S104). The pattern shows a typical timing at which a termination condition 402 ("sensor A is ON") is met upon transition from step S101 to step S102 and another typical timing at which a termination condition 403 ("sensor B is ON") is met upon transition from step S102 to step S103. In actual axis movements, after the termination condition 402, ("In[PORT0]==ON") and termination condition 403 ("In[PORT1]==ON") are each met, a delay time takes place before transition is made to the next step, i.e., until the velocity of movement is changed. The control program shown in FIG. 2 designates tolerable latency so as to manage the delay time.

Figure 4:
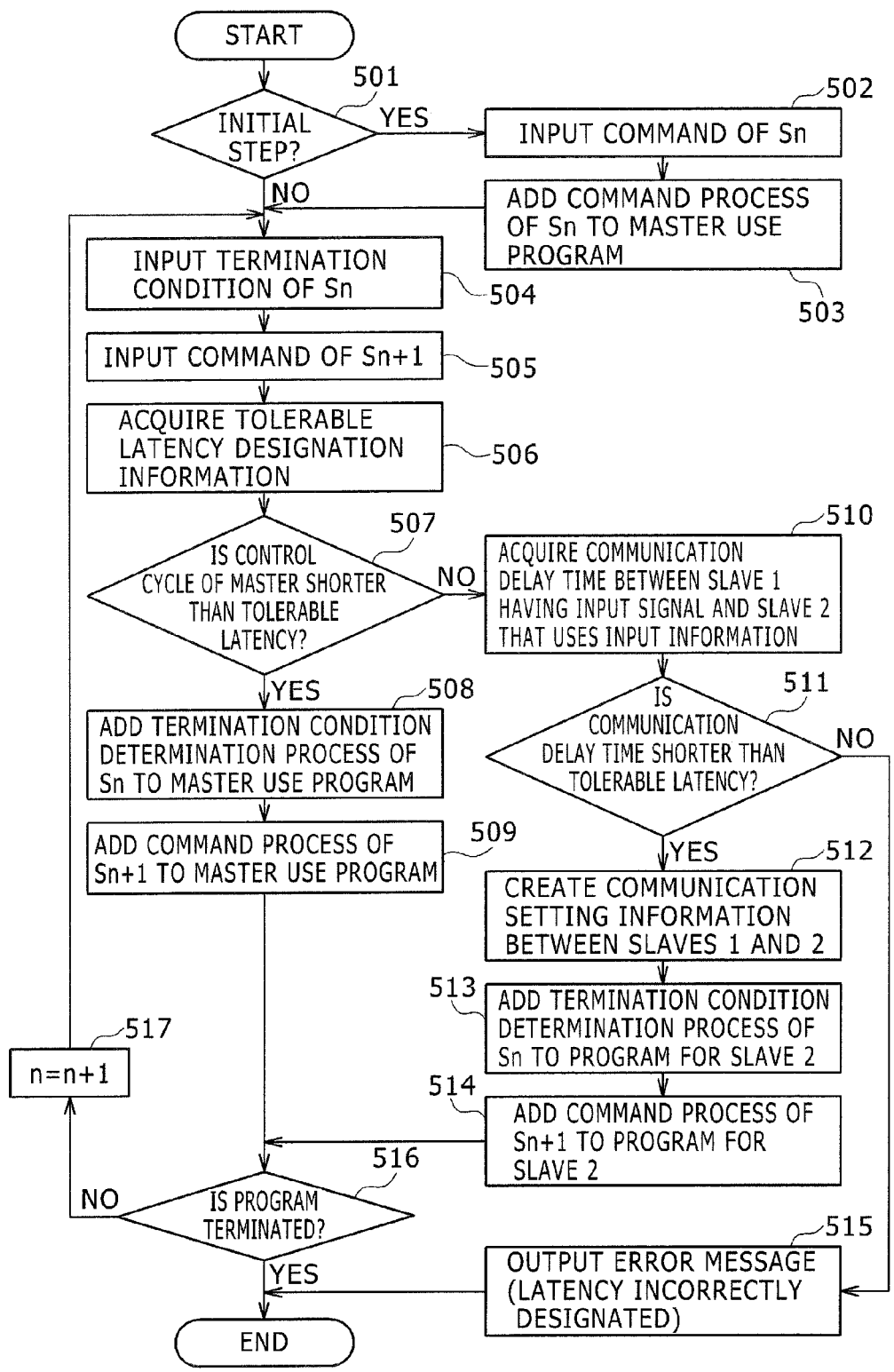
FIG. 4 is a flowchart showing details of a program analysis process performed by a program analysis unit of a master controller constituting part of the above-mentioned motion controller.

Further, FIG. 4 is a flowchart showing a typical program analysis process performed by a program analysis unit (indicated by reference character 1g in FIG. 1) of the motion controller as one embodiment of the invention. This program analysis unit performs the analysis process sequentially, starting from the first step (initial step) of the control program such as one shown in FIG. 2 and proceeding in order of step numbers n.

In the initial step (process 501), it is determined whether this is the initial step. When this step is determined to be the initial step ("Yes"), the command of step Sn is input from the control program (process 502). Then the command process of Sn is added to the master use program (process 503), before transition is made to a process 504.

On the other hand, if it is determined in the process 501 that this step is not the initial step ("No"), the transition condition for the next step Sn+1 is input (process 504). The command of step Sn+1 is input (process 505), and tolerable latency designation information is acquired from the transition condition of step Sn+1 (process 506).

At this point, it is determined whether the control cycle of the master controller is shorter than predetermined tolerable latency (process 507). If the control cycle is determined to be shorter than the predetermined tolerable latency ("Yes"), it is concluded that the master controller can respond within the tolerable latency. In this case, a termination condition determination process of step Sn is added to the master use program (process 508). Furthermore, the command process of step Sn+1 is added to the master use program (process 509), before transition is made to a process 516.

On the other hand, if the control cycle of the master controller is determined not to be shorter than the designated tolerable latency ("No") in the determination process 507, then it is concluded that program execution by the slave controller is necessary (process 510). In this process, a communication delay time is acquired between the slave controller (assumed to be slave (1) here) to which the input signal included in the termination condition of step Sn is connected and another slave controller (assumed to be slave (2) here) to which the control target apparatus operated by the command of step Sn+1 is connected.

It is determined whether the communication delay time between the slave (1) and slave (2) is shorter than the designated tolerable latency (process 511). If the communication delay time is shorter than the tolerable latency ("Yes"), slave-to-slave communication setting information is created between the slave (1) and slave (2) (process 512). A termination condition determination process of step Sn is added to the slave use program for the slave (2) (process 513). After the command process of step Sn+1 is further added to the slave use program for the slave (2), transition is made to a process 516.

On the other hand, if the result of the determination process 511 above reveals that the communication delay time between the slave (1) and the slave (2) is not shorter than the tolerable latency ("No"), an error message is output indicating that the value of the designated tolerable latency is impracticable (process 515). Thereafter, the program analysis process is terminated.

If the last step of the control program input to the program analysis process is reached, i.e., if the result of a program termination determination (process 516) is affirmative ("Yes"), the program analysis process is also terminated.

By contrast, if the program has yet to be terminated (the result of the determination process 516 is "No"), the step number n is incremented by 1 (process 517), and the process 514 above is reached again. The analysis process above is thereafter repeated until the program is terminated.

Figure 5:
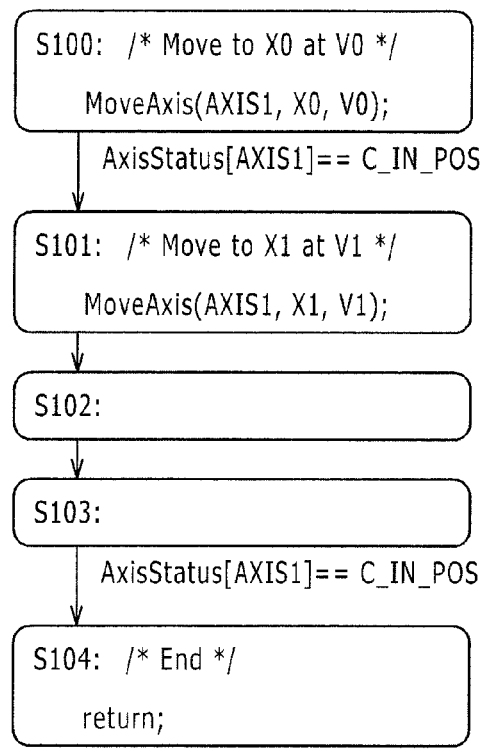
FIG. 5 shows a typical master use program created by analyzing the control program indicated in FIG. 2.
Figure 6:
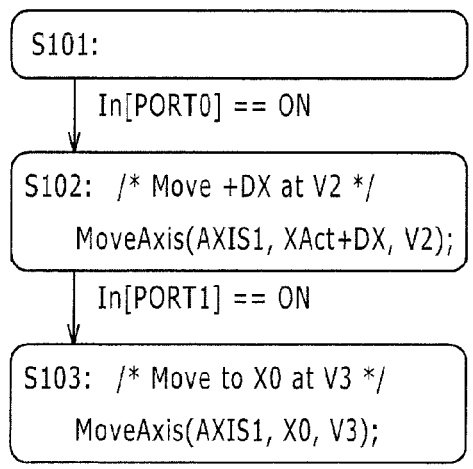
FIG. 6 shows a typical slave use program created by analyzing the control program indicated in FIG. 2.

Next, FIGS. 5 and 6 show a typical master use program and a typical slave use program, respectively, each created by analyzing the control program indicated in FIG. 3.

First, as shown in FIG. 5, the master use program left after the slave use program is separated from the control program indicated in FIG. 2 dispenses with the processes shifted to the slave use program. As a result, blank steps having solely step numbers (S102, S103) are created.

Meanwhile, as shown in FIG. 6, the processes ranging from the termination condition determination process of step S101 to the command process of step S103 are separated as the slave use program (at this point, the conditional expression for designating the tolerable latency is omitted). In this example, the control cycle of the master controller is set to 1 millisecond, and the processes of the steps in which the tolerable latency is set to be shorter than that control cycle are separated as the slave use program.

For slave controllers to execute the slave use program shown in FIG. 6, it is necessary to identify the slave controller to which the input signal included in the termination condition of each step is connected, and the slave controller to which the control target apparatus to be operated by commands is connected, as mentioned above. What is used here are the input/output port mapping table and axis mapping table to be explained below.

FIG. 7 shows a typical input/output port mapping table, and FIG. 8 indicates a typical axis mapping table.

The input/output port mapping table shown in FIG. 7 describes logical "input port numbers" 801 of the motion controller, "slave numbers" 802 of the slave controller to which the input signals assigned to these input ports are connected, and "device names" of these input signals. For example, in the case of the slave use program indicated in FIG. 6, "sensor A" and "sensor B" connected to input ports 0 and 1 respectively are referenced as the termination condition. Consequently, these devices are understood to be connected to the slave controller having the slave number 1.

On the other hand, the axis mapping table shown in FIG. 8 describes logical "axis numbers" 901 of the motion controller, "slave numbers" 902 of the slave controllers to which the axes that are assigned these numbers are connected, and "axis names" 903 of these axes. For example, in the case of the slave use program shown in FIG. 6, the command to move "motor 1" assigned to the axis number 1 (AXIS1) is described. Consequently, the axis in question is understood to be connected to the slave controller having the slave number 1.

As explained above, according to the present invention, the input/output port mapping table and axis mapping table are used to identify one slave controller for executing the slave use program and another slave controller that needs to conduct slave-to-slave communication with that slave controller. Thus slave-to-slave communication settings are established and the slave use program is transferred between these slave controllers.

Figure 9:
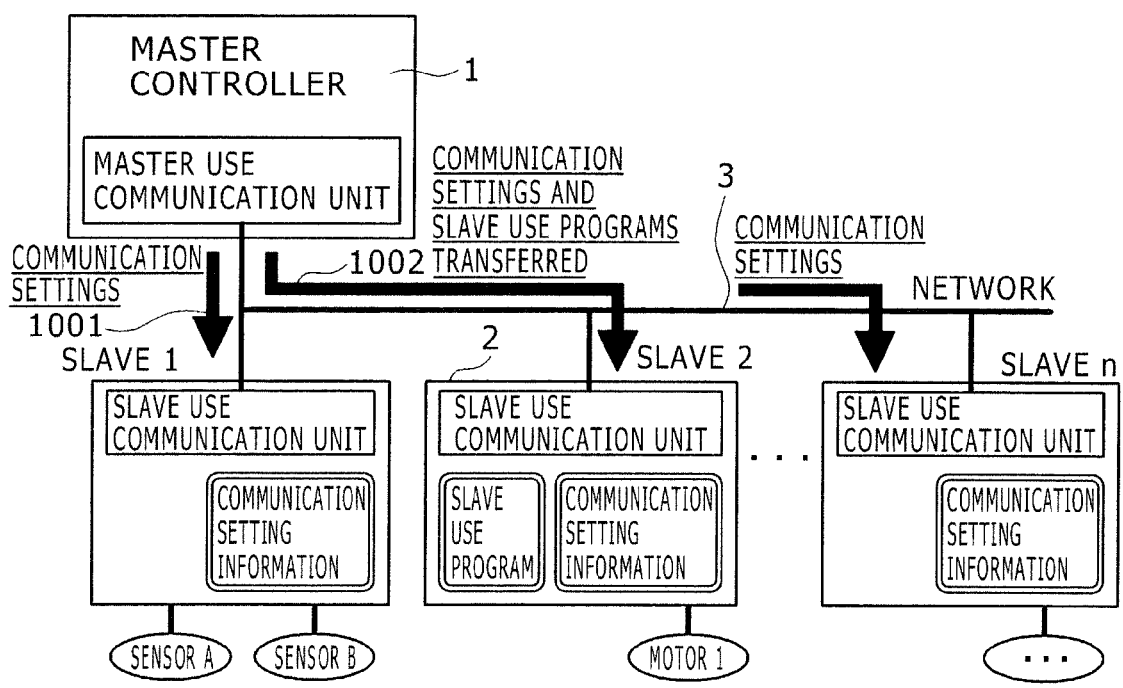
FIG. 9 shows typical operations upon initial setting of the above-mentioned motion controller.

Next, FIG. 9 shows typical operations upon initial setting of the motion controller. FIG. 9 indicates the initial setting in effect when the slave use program shown in FIG. 6 is executed.

Communication setting information including slave-to-slave communication setting information is transferred from the master controller 1 to the slave controller having the slave number 1 (indicated as "SLAVE 1" in FIG. 9) via the network 3 (indicated by arrow 1001). The communication setting information including the slave-to-slave communication setting information and the slave use program shown in FIG. 6 are transferred from the master controller 1 to the slave controller having the slave number 2 (indicated as "SLAVE 2" in FIG. 9) via the network 3 (indicated by arrow 1002).

Figure 10:
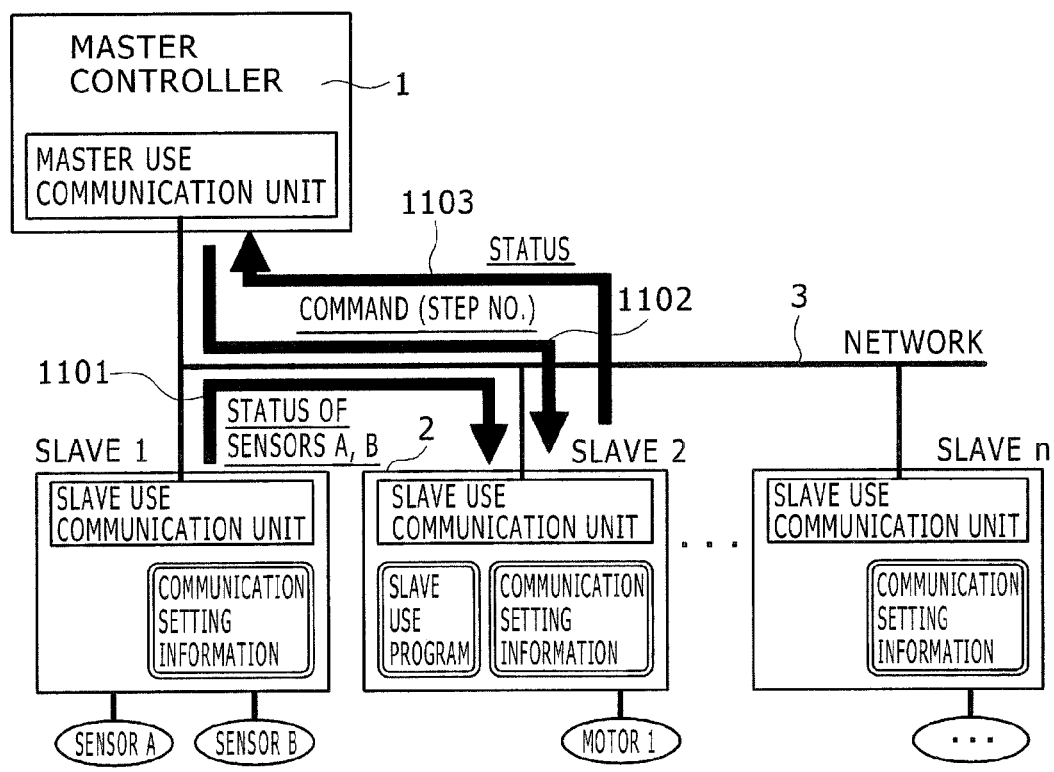
FIG. 10 shows typical operations upon program execution of the above-mentioned motion controller.

Meanwhile, FIG. 10 shows typical operations upon program execution of the motion controller. This drawing shows communication processing in effect when the slave use program indicated in FIG. 6 is executed.

Input signal status of "sensor A" and "sensor B" is transmitted from the slave 1 to the slave 2 through slave-to-slave communication (indicated by arrow 1101). And the step number of the step currently executed by the master controller 1 is transmitted from the master controller 1 to the slave 2 (indicated by arrow 1102). If this command (i.e., step number) matches the first step number of the slave use program (S101 in FIG. 6), the slave use program starts being executed. Thereafter, the status of the execution is transmitted as "status (information)" to the master controller 1 (indicated by arrow 1103). Upon executing the master use program, the master controller 1 transmits commands to each of the slave controllers configured. Each slave controller transmits command execution status as status (information) to the master controller 1.

Figure 11:
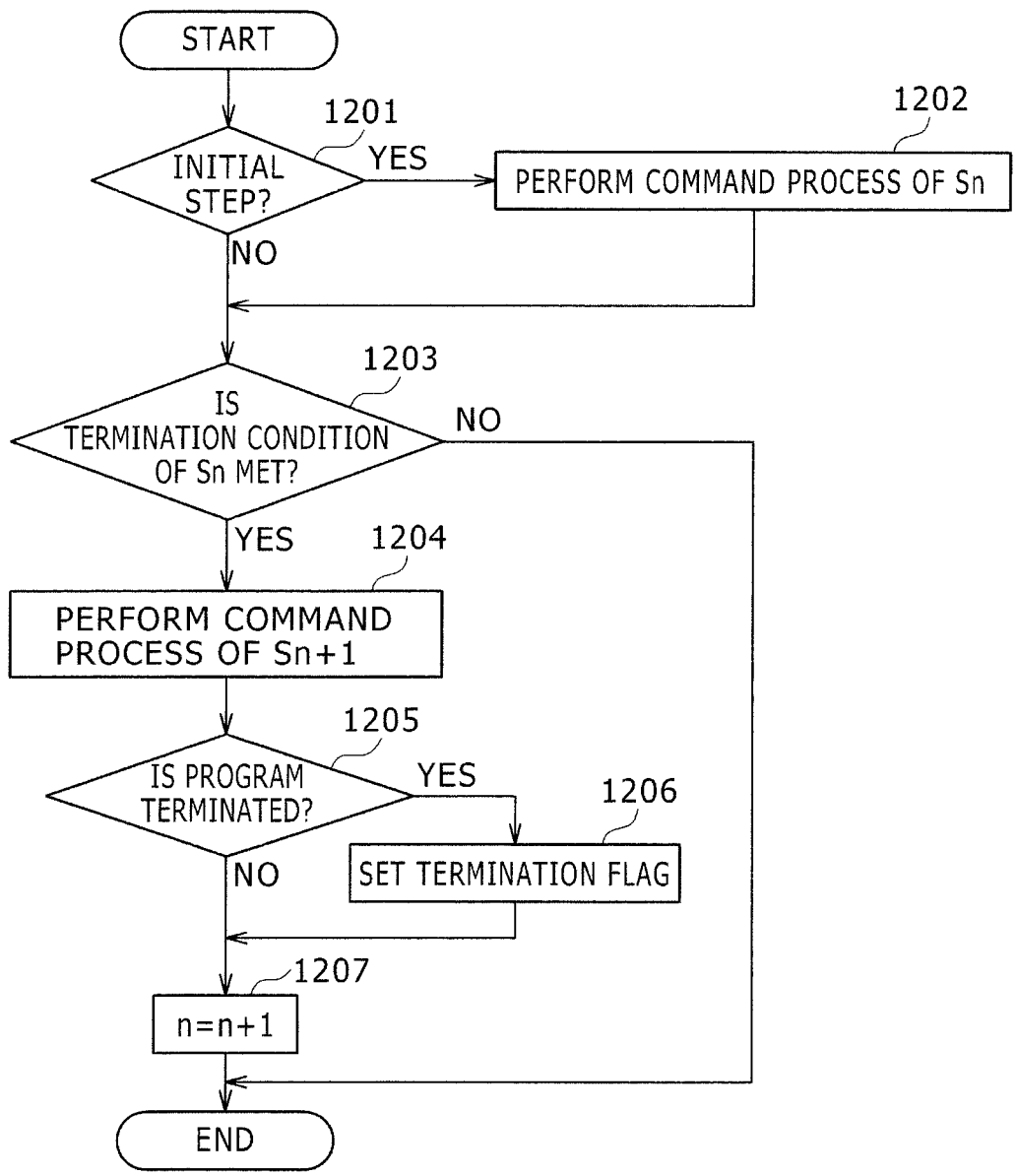
FIG. 11 is a flowchart showing details of a program execution process performed by a master use program execution unit of the above-mentioned motion controller.

FIG. 11 is a flowchart showing details of the program execution process performed by a master use program execution unit (having reference character 1n in FIG. 1) of the motion controller 1. The master use program execution unit 1n executes sequentially the processing described in each of the steps of the master use program (having reference character 1m in FIG. 1), starting from the initial step.

When the program execution is started, it is first determined whether step Sn is the initial step, "n" being the step number of the currently executing process (process 1201). If the result of this determination reveals that step Sn is the first step ("Yes"), the command process of step Sn is executed (process 1202). Then transition is made to a process 1203.

On the other hand, if the result of the determination process 1201 reveals that step Sn is not the initial step ("No"), it is further determined whether the termination condition of step Sn is met (process 1203). If the result of this determination reveals that the termination condition is met ("Yes"), the command process of the next step Sn+1 is executed (process 1204). Thereafter, it is further determined whether the program is terminated in step Sn+1 (process 1205). If the result of this determination reveals that the program is terminated in step Sn+1 ("Yes"), a termination flag is set to indicate the termination of the program in question (process 1206). Transition is then made to a process 1207.

By contrast, if the determination process 1205 reveals that the program is not terminated in step Sn+1 ("No"), the step number n is incremented by 1 (process 1207), and the program execution process is terminated. The program execution process is also terminated if the determination process 1203 reveals that the termination condition of step Sn is not met ("No").

The program execution process above is carried out at constant intervals (i.e., control cycle) by the master controller 1. The step number of the currently executing step is managed for each master use program executed by the master controller 1. Likewise, the termination flag above is provided for each master use program. As a result, once the termination flag is set, the program execution process is not carried out.

Figure 12:
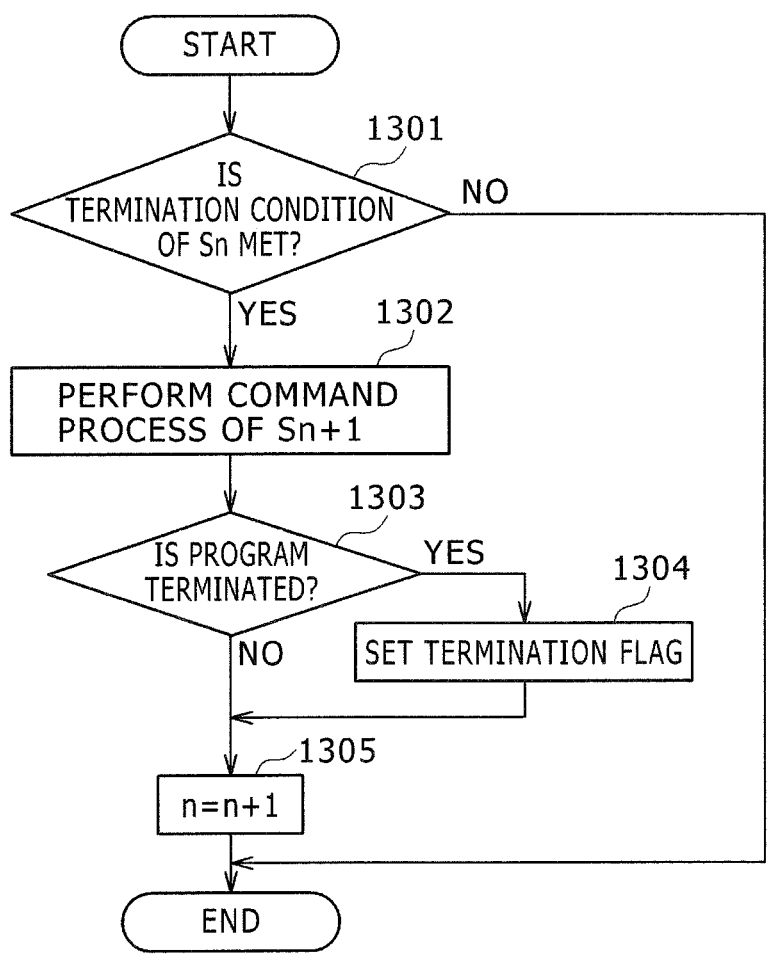
FIG. 12 is a flowchart showing details of a program execution process performed by a slave use program execution unit of the above-mentioned motion controller.

FIG. 12 is a flowchart showing details of the program execution process performed by the slave use program execution unit (having reference character 2g in FIG. 1) constituting part of the motion controller embodying this invention. The slave use program execution unit 2g executes sequentially the processing described in each of the steps of the slave use program (having reference character 2e in FIG. 1) in order of step numbers.

When the program execution is started, it is first determined whether the termination condition of step Sn is met, "n" being the step number of the currently executing process (process 1301). If the result of this determination reveals that the termination condition of step Sn is met ("Yes"), the command process of the next step Sn+1 is executed (process 1302). Thereafter, it is determined whether the program is terminated in step Sn+1. If the result of this determination reveals that the program is terminated in step Sn+1 ("Yes"), a termination flag is set (process 1304), and transition is made to a step 1305.

On the other hand, if the determination process 1303 reveals that the program is not terminated in step Sn+1 ("No"), the step number n is incremented by 1 (process 1305). Thereafter, the program execution process is terminated. The program execution process is also terminated if the determination process 1301 reveals that the termination condition of step Sn is not met ("No").

The program execution process above is carried out at constant intervals by the slave controller 2. Once the termination flag is set, the program execution process is not carried out. Since the number of devices to be controlled by a single slave controller is limited, the load on each slave controller executing its program is small. For this reason, there is no need to provide a processor or the like offering enhanced arithmetic capacity as the slave controller.

Figure 13:
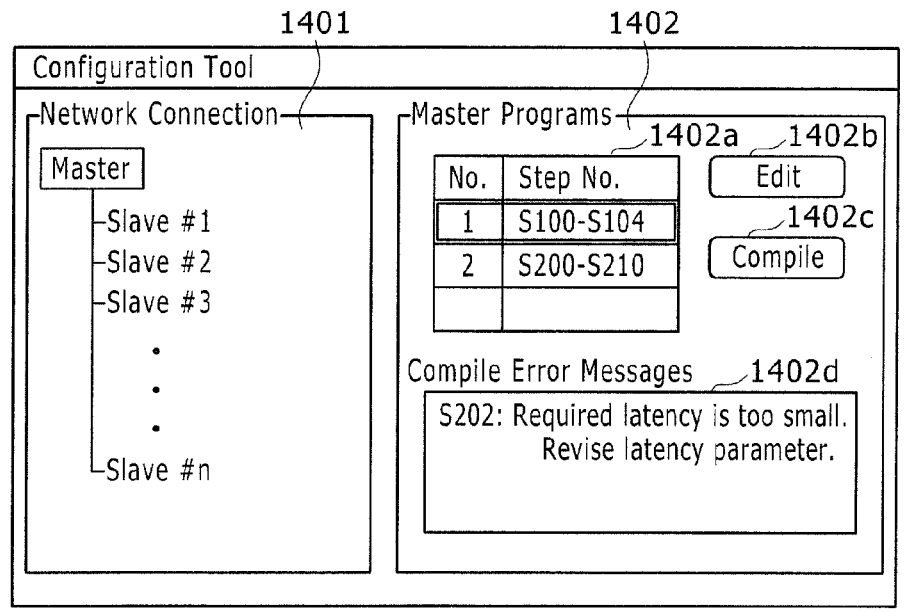
FIG. 13 shows a typical screen display for operating a communication setting unit, a program editing unit, and a program analysis unit of the master of the above-mentioned motion controller.

Furthermore, FIG. 13 shows a typical screen display for operating the communication setting unit 1b, program editing unit 1e, and program analysis unit 1g constituting the master controller 1 of the above-mentioned motion controller indicated in FIG. 1.

On the screen display shown in FIG. 13, selecting the master controller (indicated as "Master" in FIG. 13) in a portion 1401 indicative of a network connection configuration causes a portion 1402 to appear and display information about the programs stored in the master controller 1. A table 1402a listing the programs is displayed in the portion 1402. Selecting one of the displayed programs and clicking on an edit button (indicated as "Edit" in FIG. 13) 1402b causes a different program editing screen (not shown) to appear, permitting editing of the selected program. And clicking on a compile button (indicated as "Compile" in FIG. 13) 1402c executes a program analysis process. And if any error occurs during the analysis process, an error message 1402d is displayed.

Figure 14:
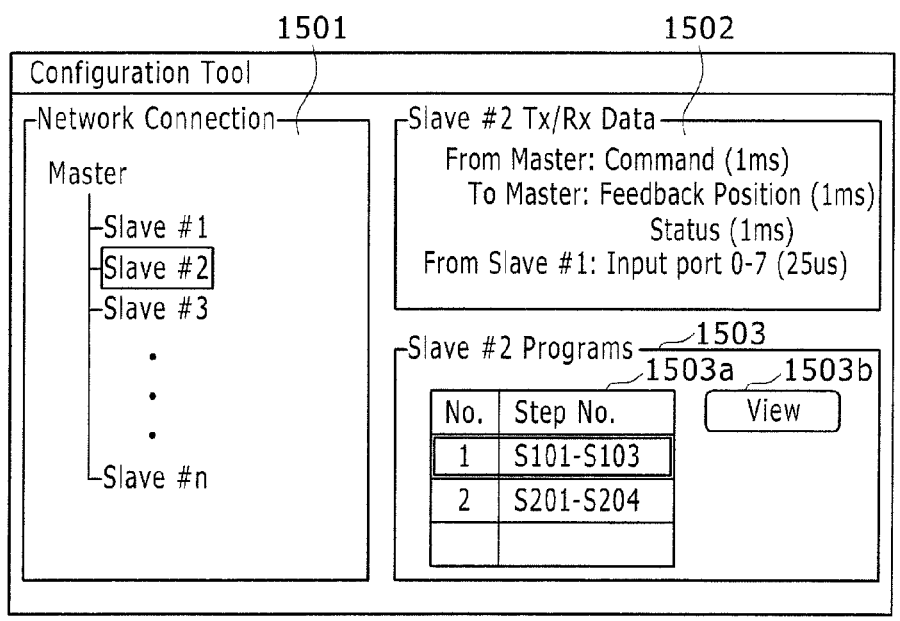
FIG. 14 shows a typical screen display for verifying communication setting information and a slave use program for each slave of the above-mentioned motion controller.
Figure 15:
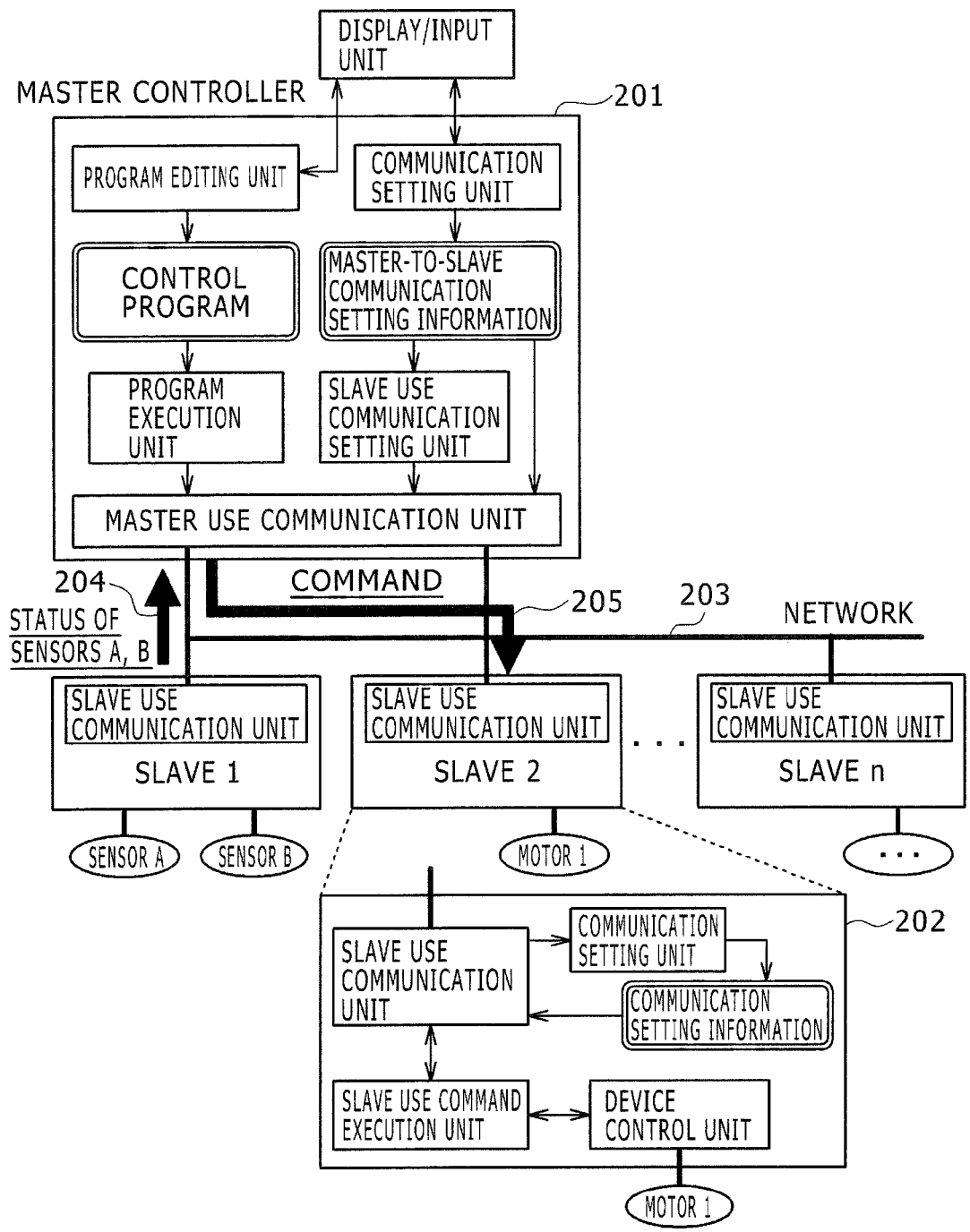
FIG. 15 shows a structure of a conventional network type motion controller.

FIG. 14 shows a typical screen display for verifying the communication setting information 2b and slave use program 2e constituting each slave of the above-mentioned motion controller.

On the screen display shown in FIG. 14, selecting one of the slave controllers (indicated as "Slave" in FIG. 14) in a portion 1501 showing the network connection configuration causes a portion 1502 to appear and display the communication setting information about the selected slave controller. The portion 1502 displays the definition of the data exchanged between the master and the slave and the communication delay time therebetween, as well as the definition of the data communicated between the slaves and the communication delay time therebetween. Also, a portion 1503 indicating the slave use program of the selected slave controller displays a table 1503a giving a list of slave use programs. Selecting one of the listed programs and clicking on a display button (indicated as "View" in FIG. 14) 1503b causes a different program display screen (not shown) to appear, permitting verification of the details of the selected program.

As explained above in detail, the embodiment of the present invention includes the program analysis means that separates, from the control program with the tolerable delay time designated therein for operation of control target apparatuses, the slave use program to be executed by the slave controller in a manner not to exceed the tolerable delay time, and generates the slave-to-slave communication setting information needed by the slave controller to execute the separated slave use program. Also included in the embodiment is the slave use program execution means for the slave controller. The invention when thus embodied provides the motion controller capable of improving system responsiveness without having to boost the arithmetic capacity of the master controller or to raise the communication speed of the network.

DESCRIPTION OF REFERENCE NUMERALS

1 Master controller
1a Display/input unit
1b Communication setting unit
1c Master-to-slave communication setting information storage unit
1d Master use communication unit
1e Program editing unit
1f Control program storage unit
1g Program analysis unit
1h Slave-to-slave communication setting information storage unit
1i Slave use communication setting unit
1j Slave use program storage unit
1k Slave use program transfer unit
1m Master use program storage unit
1n Master use program execution unit
2 Slave controller
2a Communication setting unit
2b Communication setting information storage unit
2c Slave use communication unit
2d Program transfer unit
2e Slave use program storage unit
2f Slave use command execution unit
2g Slave use program execution unit
2h Device control unit
2i Control target apparatus
3 Network

The invention claimed is:

1. A motion controller comprising a master controller and at least one slave controller interconnected to each other via a network so as to perform input/output operation or control processing on a plurality of control target apparatuses;
   wherein the master controller includes:
      a program analysis means which inputs a control program with a tolerable delay time designated therein for operation of the control target apparatuses, separates from the control program a slave use program to be executed by the slave controller in a manner not to exceed the delay time, and generates slave-to-slave communication setting information needed by the slave controller to execute the separated slave use program;
      a master use program execution means which executes a master use program left after the slave use program is separated from the control program;
      a slave use program transfer means which transfers the slave use program to the slave controller via the network;
      a slave-to-slave communication setting means which transfers master-to-slave communication setting information and the slave-to-slave communication setting information to the slave controller via the network, and
      a master use communication means which performs communication control between the master controller and the slave controller via the network, and
   wherein the slave controller includes:
      a slave use program execution means which executes the slave use program transferred from the master controller;
      a slave use command execution means which executes a slave use command transmitted from the master controller via the network and received by the slave controller and a slave use command issued by the slave use program execution means;
      a slave use communication setting means which stores the master-to-slave communication setting information and the slave-to-slave communication setting information, and
      a slave use communication means which, based on the master-to-slave communication setting information and the slave-to-slave communication setting information, performs communication control between the slave controller and the master controller as well as between the slave controller and another slave controller via the network.

2. The motion controller according to claim 1, wherein the control program is written using a state transition diagram format, describes the commands to be executed in steps each indicative of different status, describes a termination condition for terminating each of the steps when the termination condition is met, and explicitly describes a tolerable delay time that elapses from the time the termination condition is met until the time the next step is executed.

3. The motion controller according to claim 1, wherein the program analysis means of the master controller acquires information about the delay time that is tolerable when the control target apparatuses described in the control program are operated, the program analysis means further creating the master use program and the slave use program from the control program in such a manner that if the tolerable delay time is longer than a control cycle of the master controller, the control target apparatuses are operated within the master use program and that if the tolerable delay time is shorter than a control cycle of the master controller, the control target apparatuses are operated within the salve use program of the slave controller for directly driving the control target apparatuses, and wherein, if the slave use program references input/output information about the other slave controller, the program analysis means communicates with the slave controller so as to create the slave-to-slave communication setting information for acquiring the input/output information.

4. The motion controller according to claim 1, wherein the program analysis means acquires information about the delay time that is tolerable when the control target apparatuses described in the control program are operated, and wherein, if the tolerable delay time cannot be met despite communication with the slave controller, the program analysis means outputs an error message indicating that the tolerable delay time is incorrectly designated.

5. The motion controller according to claim 1, wherein, upon initial setting of the motion controller, the slave use communication setting means transfers the master-to-slave communication setting information and the salve-to-slave communication setting information to the slave controller via the network, and the slave use program transfer means transfers the slave use program to the slave controller.

6. The motion controller according to claim 1, wherein, upon program execution of the motion controller, the master use program execution means of the master controller executes the master use program to transmit commands to the slave controller and to receive status information from the slave controller, and wherein the slave controller acquires input/output information about the other slave controller based on the slave-to-slave communication setting information, and the slave use program execution means of the slave controller executes the slave use program to transmit status information indicative of current execution status to the master controller.

7. The motion controller according to claim 1, further comprising a display/input means connected to the motion controller, wherein the display/input means permits input of the master-to-slave communication setting information, editing of the control program, execution of the program analysis means, and verification of the master use program with regard to the master controller, and wherein the display/input means permits verification of the master-to-slave communication setting information, the slave-to-slave communication setting information, and the slave use program with regard to the slave controller.

* * * * *